United States Patent [19]

Oku

[11] Patent Number: 5,553,809
[45] Date of Patent: Sep. 10, 1996

[54] PAPER MAGAZINE

[75] Inventor: Hiroshi Oku, Wakayama, Japan

[73] Assignee: Noritsu Koki Co., Ltd., Wakayama, Japan

[21] Appl. No.: 261,043

[22] Filed: Jun. 14, 1994

[30] Foreign Application Priority Data

Jun. 15, 1993 [JP] Japan .................................. 5-143561
Apr. 27, 1994 [JP] Japan .................................. 6-089681

[51] Int. Cl.$^6$ ............................ B65H 26/06; B65H 43/00; B65H 20/02
[52] U.S. Cl. .................................. 242/563.1; 242/534.1; 242/564.4; 355/72
[58] Field of Search .................... 242/534.1, 563.1, 242/357, 564.4, 535.3, 354; 355/72

[56] References Cited

U.S. PATENT DOCUMENTS

| | | | |
|---|---|---|---|
| 4,566,785 | 1/1986 | Takenouchi | 355/72 |
| 4,765,555 | 8/1988 | Gambino | 242/564.4 |
| 5,107,296 | 4/1992 | Ozawa et al. | 355/28 |
| 5,181,065 | 1/1993 | Ozawa et al. | 355/29 |

FOREIGN PATENT DOCUMENTS 2194016  2/1988  United Kingdom .

*Primary Examiner*—John Q. Nguyen
*Attorney, Agent, or Firm*—Wenderoth, Lind & Ponack

[57] ABSTRACT

A paper magazine is capable of feeding and rewinding a web of paper automatically without forming any indentation in or causing meandering of the web of paper. A pair of press rollers and a paper detection roller are provided along a feed path extending from the core of a paper roll in a paper magazine case to a paper outlet. A cam plate and an engaging roller control the movement of the press rollers toward and away from each other according to the position of the paper detection roller. The transmission of driving force to the core of the paper roll and the press rollers is changed over according to the position of the paper detection roller. The press rollers are pressed against the paper only when feeding and rewinding the paper.

21 Claims, 15 Drawing Sheets

PAPER MAGAZINE

BACKGROUND OF THE INVENTION

1. Field of the Invention

This invention relates to a paper magazine for feeding and rewinding a photographic paper from and onto a roll of paper rotatably mounted on the magazine and used e.g. to feed a web of photographic paper to a photographic printing apparatus.

2. State of the Prior Art

As shown in FIG. 20, a photographic printing apparatus has a light source 81 that emits light through a mirror tunnel 82 at a negative film 84 on a negative mask 83 to print negative images on the negative film 84 through a printing lens 85 onto photographic paper P on an exposure unit 86.

This conventional photographic printing apparatus B carries a plurality of paper magazines A, A' accommodating a roll R of photographic paper P having different print sizes from each other. The photographic paper P in one of the paper magazines A is pulled out to the exposure unit 86 for printing. When changing the print size, after rewinding the photographic paper into the paper magazine A, the photographic paper in the other paper magazine A' is pulled out.

When changing the photographic paper in one paper magazine to the paper in the other, a cutter device 87 disposed in the feed path of photographic paper extending from the paper magazine A to the exposure unit 86 is activated to cut the photographic paper P. Then, the portion of the photographic paper P that protrudes from the paper magazine A is rewound into it. Then, the photographic paper P in the other paper magazine A' is pulled out until its tip is caught between a pair of advance rollers 54 provided in the paper feed path.

Such conventional paper magazines for feeding and rewinding photographic paper come in two types, that is, the type having a built-in feeding and rewinding mechanism and the type having no such mechanism. When using a paper magazine of the latter type, photographic paper is put in the magazine with its tip protruding slightly from the magazine. The magazine is then set in the photographic printing apparatus with the protruding end of the paper caught between the advance rollers 54.

On the other hand, a paper magazine of the former type has a feed roller adapted to be pressed against the photographic paper provided near the paper outlet of the paper magazine. By manually controlling a knob coupled to the feed roller, the photographic paper is fed and rewound.

When using a paper magazine without the feeding and rewinding mechanism, since the tip of the paper has to protrude from the magazine, this portion is necessarily exposed to light. Useless portions thus form on the paper.

Also, it is necessary to pull out the photographic paper so that its leading end can be caught between the advance rollers. If pulled out too much, the unnecessary portion has to be cut off. Such work is extremely troublesome.

On the other hand, a paper magazine having the feeding/rewinding mechanism has a problem in that since the feed rollers are always pressed against the photographic paper, it is likely to develop indentations and surface irregularities. Also, when feeding, the paper is likely to meander.

Also, since the length by which the photographic paper can be fed or rewound is limited, it is difficult to use a single magazine for different kinds of photographic printing apparatus.

Besides, in either of the abovementioned paper magazines, the paper is rewound onto the core of the paper roll in the magazine by rotating the core itself. Thus, if the paper rear end should come off the core of the paper roll, it becomes impossible to further rewind the paper. This means that the entire part of the paper in the feed path in the magazine is wasted.

SUMMARY OF THE INVENTION

It is an object of this invention is to provide a paper magazine which can feed and rewind paper automatically by supplying a driving force from outside of the magazine and which can prevent indentations on the paper or meandering of the paper while being fed.

Another object of this invention is to provide a paper magazine which can reliably rewind paper even if its rear end should come of the core of the paper roll.

In order to achieve the above objects, according to this invention, there is provided a paper magazine comprising a paper magazine case for rotatably supporting a core of a roll of paper. The paper magazine case is formed with a paper outlet, a pair of press rollers provided along a paper feed path extending from the core to the paper outlet adapted to be pressed against and separated from each other with the paper therebetween, a paper detection roller provided between the press rollers and the paper outlet so as to be moved when brought into contact with the paper, a cam mechanism associated with the paper detection roller for pressing and separating the press rollers against and from each other according to the position of the paper detection roller, power transmission means coupled to the core of the paper roll and the press rollers for transmitting thereto the rotation of an external driving means, and changeover means provided in the power transmission means for selectively transmitting the driving force to the core or the press rollers according to the direction of rotation of the external driving means. The press rollers are pressed against each other with the paper therebetween when the core is rotated in a direction to feed the paper forward and the press rollers are separated from each other at any other time.

In the above arrangement, when feeding paper, the press rollers are pressed against the paper to feed the paper. The position of the paper is detected by detecting the position of the paper detection roller provided between the paper outlet and the press rollers. Based on the result of the detection, the cam mechanism is activated to press or separate the press rollers against or from each other and thus control the stop position of the paper when rewinding. The direction of transmission of the driving force, i.e. to the core or the press rollers, is changed over by the power changeover means.

Since the press rollers are brought into contact with the paper only while the paper is being fed and otherwise kept out of contact with the paper, the paper will be free from indentations and surface irregularities. Also, it will never meander while being fed.

The rewinding of the paper is stopped when the paper detection roller displaces as a result of the disappearance of the paper. Thus, by adjusting the mounting position of the paper detection roller, it is possible to freely adjust the position of the paper leading end when the rewinding is stopped. In other words, there is no restriction as to the length by which the paper is rewound.

There is also provided a paper magazine in which the cam mechanism comprises means for pressing the press rollers against each other with the paper therebetween when the core is rotated in a direction for rewinding the paper, and means for keeping the press rollers pressed against each other irrespective of the position of the paper detection roller.

With this arrangement, the press rollers are pressed against the paper when rewinding paper by the second means. Thus, by rotating the press rollers, the paper can be forcibly rewound onto the core in the magazine. Also, since the press rollers are kept pressed against the paper with the paper fully rewound, the paper can be held in position stably even if the magazine is vibrated, such as by being carried.

The paper magazine according to this invention is provided with a roller for detecting the position of the paper while it is being fed or rewound, a cam mechanism operatively associated with the paper detection roller to control the movement of the press rollers, and a power transmission means for selectively transmitting and cutting off the driving force to the core and the press rollers. The press rollers are pressed against paper only when feeding the paper. Thus, the paper can be fed accurately and stably without meandering and without the possibility of indentation or surface irregularity.

Simply by applying an external driving force, paper can be fed and rewound mechanically. Thus, by automating such work, it is possible to dramatically improve the working efficiency.

Moreover, since the paper can be rewound to any desired position, that is, the amount by which the paper is rewound is not limited, the concept of this invention is applicable to other types of devices having different paper feed paths.

According to a second embodiment of this invention, since the press rollers are pressed against the paper when rewinding it, it is possible to feed and rewind paper without leaving any part of the paper in the magazine, thus eliminating any loss of paper.

BRIEF DESCRIPTION OF THE DRAWINGS

Other features and objects of the present invention will become apparent from the following description made with reference to the accompanying drawings, in which.

DETAILED DESCRIPTION OF THE PREFERRED EMBODIMENT

Figure 1:
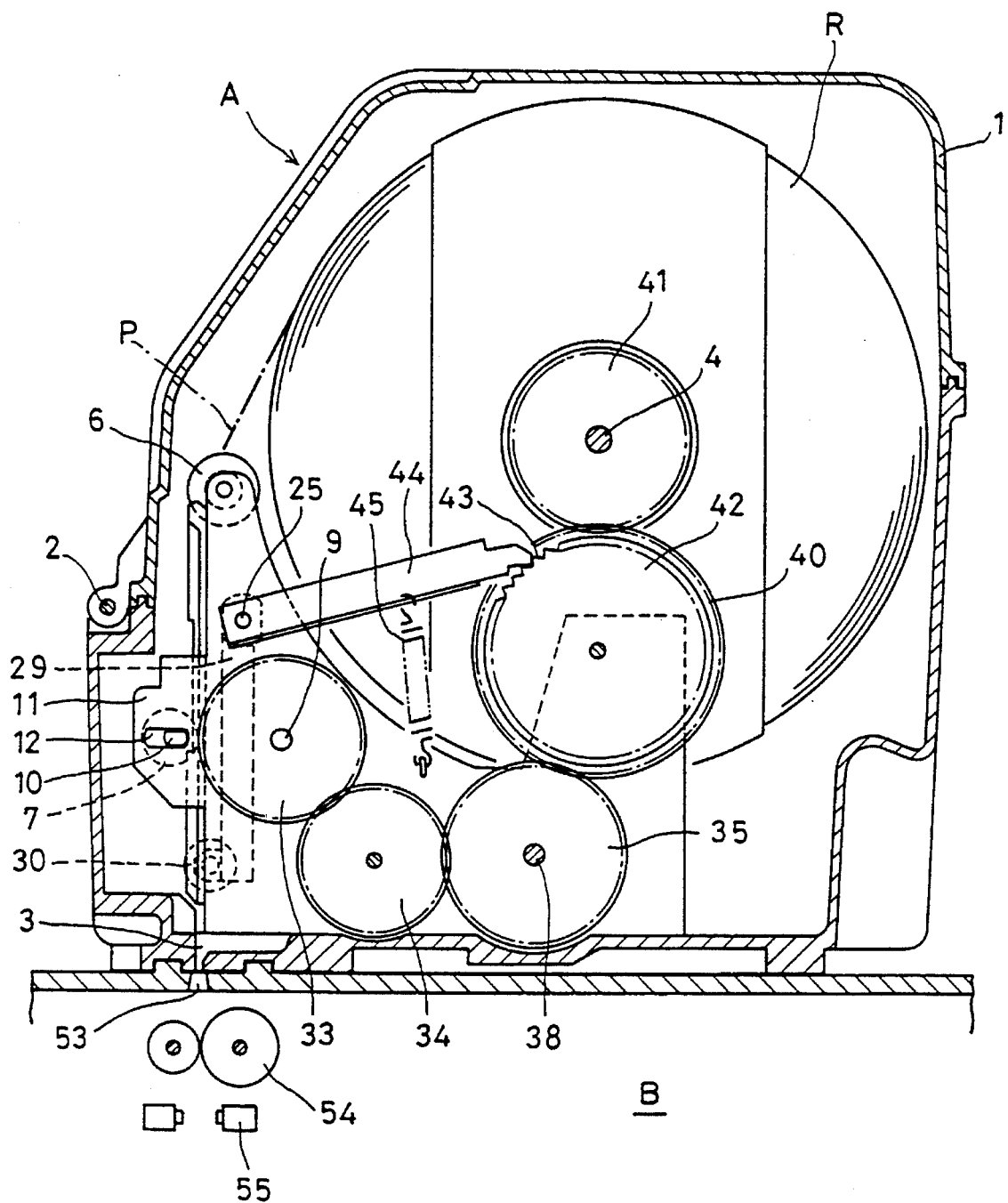
FIG. 1 is a vertical sectional front view showing the paper magazine of one embodiment.
Figure 2:
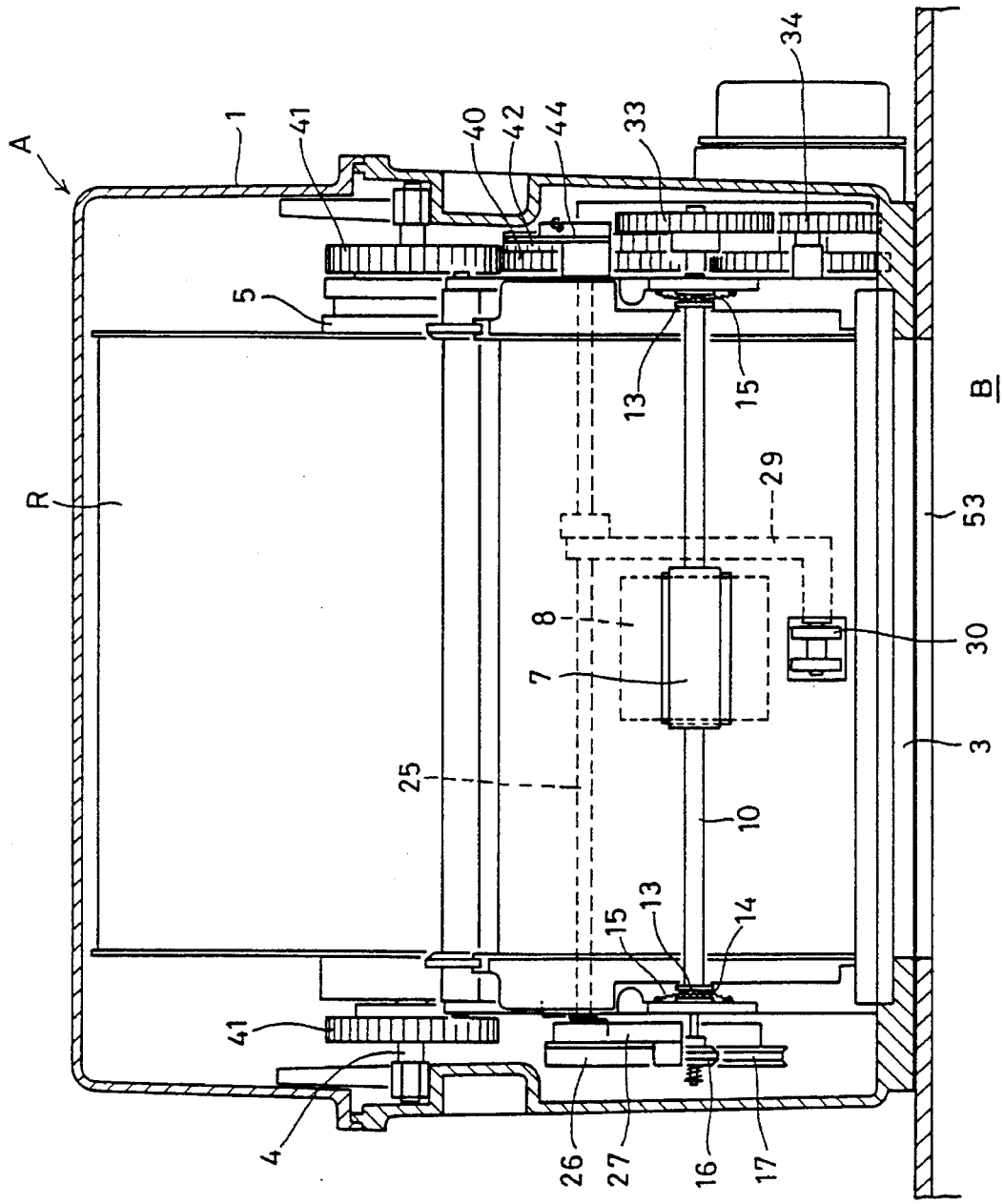
FIG. 2 is a vertical sectional side view of the same.
Figure 3:
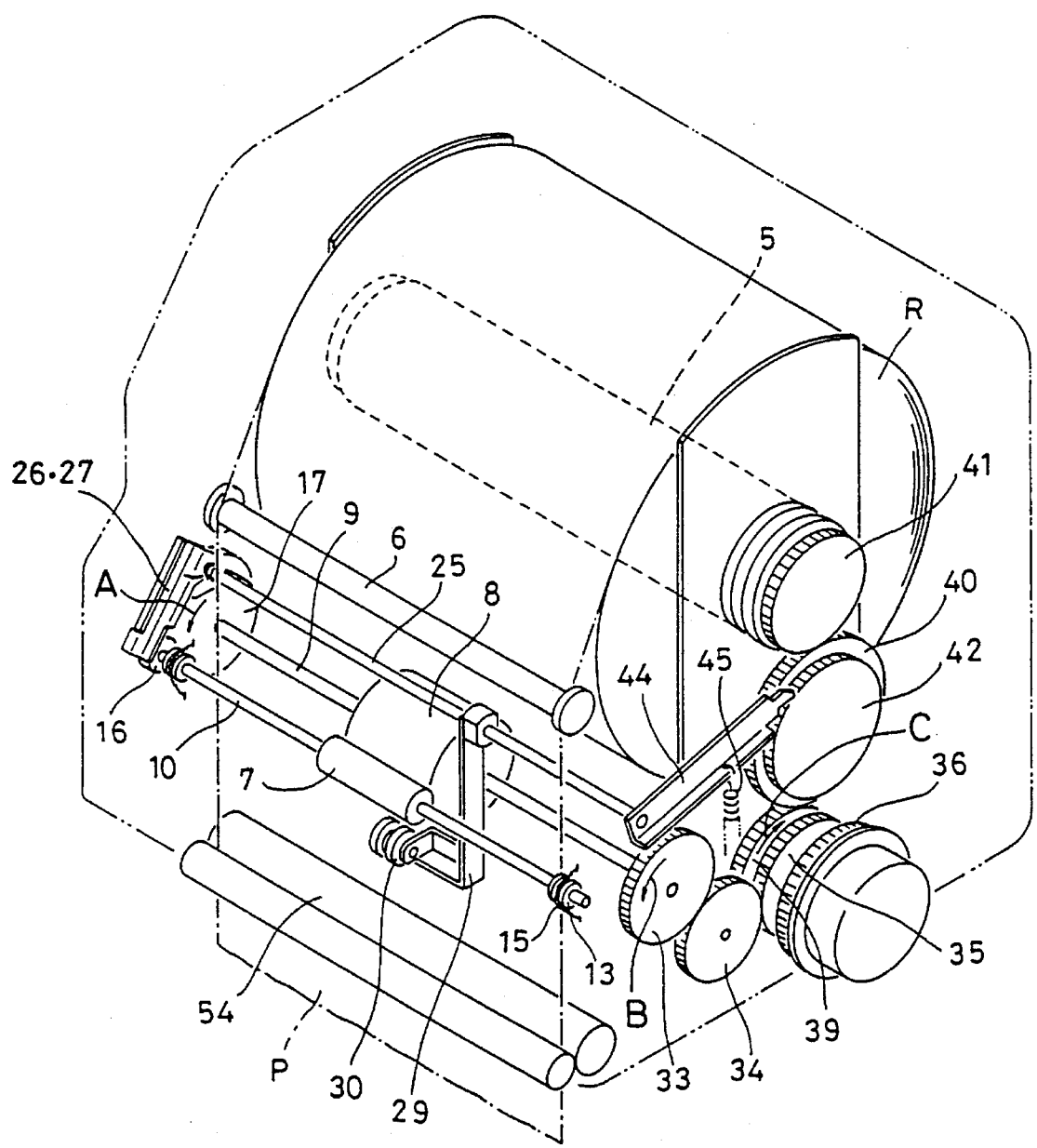
FIG. 3 is a perspective view of the same.

First referring to FIGS. 1 to 3, a paper magazine case 1 consists of two portions. It can be opened and closed by pivoting one of the two portions about a pin 2. A paper outlet 3 is defined in the lower portion of the front side of the case 1. A support shaft 4 is provided in the central portion of the paper magazine case 1. A core 5 of a roll R of photographic paper P is rotatably mounted on the support shaft 4.

Photographic paper P is pulled out from a roll R to a guide roller 6 provided in the front part of the paper magazine case 1 and then to the paper outlet 3.

In the feed path which extends from the guide roller 6 to the paper outlet 3, there are provided a pair of front and rear press rollers 7, 8 (FIG. 3). Among them, the rear large-diameter roller 8 (hereinafter referred to as a feed roller) is mounted integrally to a rotary shaft 9 that extends through the paper magazine 1.

On the other hand, the front small-diameter roller 7 (hereinafter referred to as a press roller) is mounted on a roller shaft 10 at its center. The roller shaft 10 has both its ends extending through holes 12 formed in a pair of support plates 11 provided spaced apart a predetermined distance from the inner surfaces of the side plates of the paper magazine case 1. The holes 12 are elongated in the horizontal direction as seen in FIG. 1 so that the roller shaft 10 is movable back and forth.

The roller shaft 10 carries a pair of grooved metal members 13 at points inside the support plates 11. A spring 15 fits in a peripheral groove 14 of each metal member 13 and has both its ends fixed to the respective support plate 11. The roller shaft 10 is thus urged rearwards by the springs 15, so that the press roller 7 is pressed against the feed roller 8.

The roller shaft 10 is provided parallel to the rotary shaft 9, which carries the feed roller 8, and carries at its one end an engaging roller 16 which forms a cam mechanism in cooperation with a cam plate 17 mounted on one end of the rotary shaft 9 so as to be located opposite to the engaging roller 16.

Figure 8:
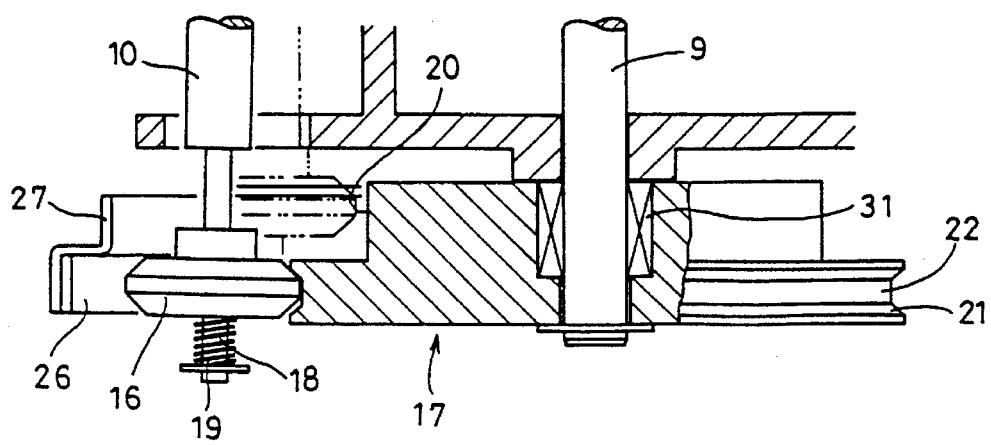
FIG. 8 is a vertical sectional side view of the same.

As shown in FIG. 8, the engaging roller 16 is axially slidably mounted on a guide shaft 18 provided at the end of the roller shaft 10. The guide shaft 18 also carries a spring 19 to urge the engaging roller 16 to a reference position with respect to the cam plate 17.

Figure 7:
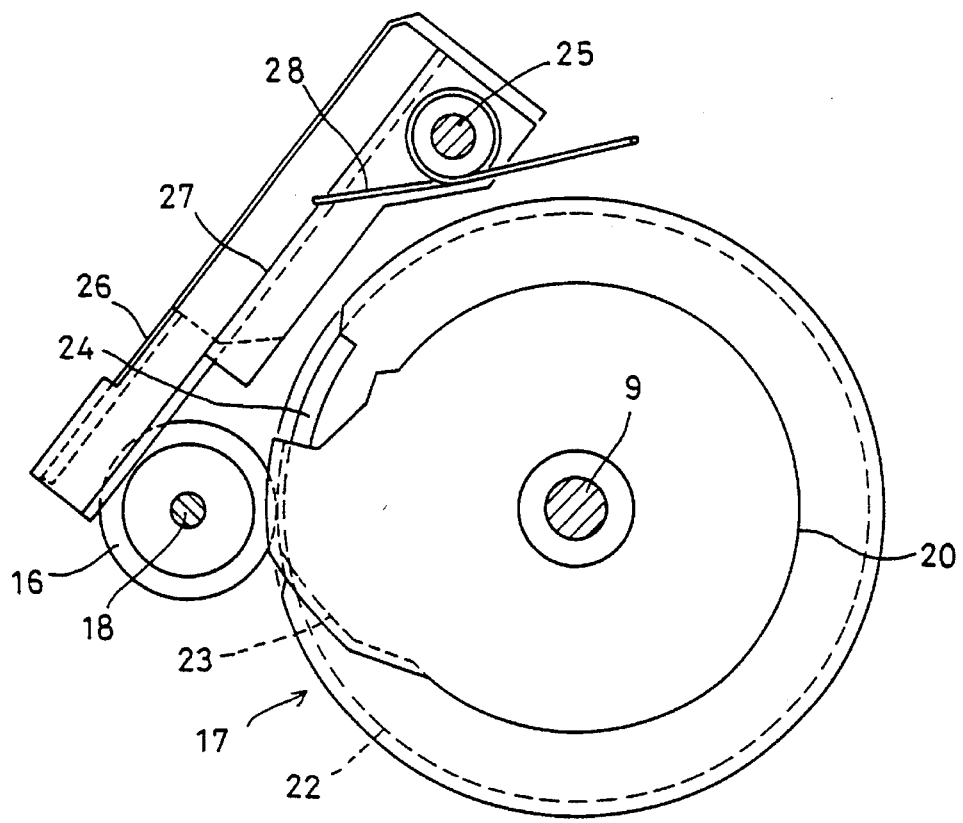
FIG. 7 is a front view showing the cam mechanism of the same.
Figure 9:
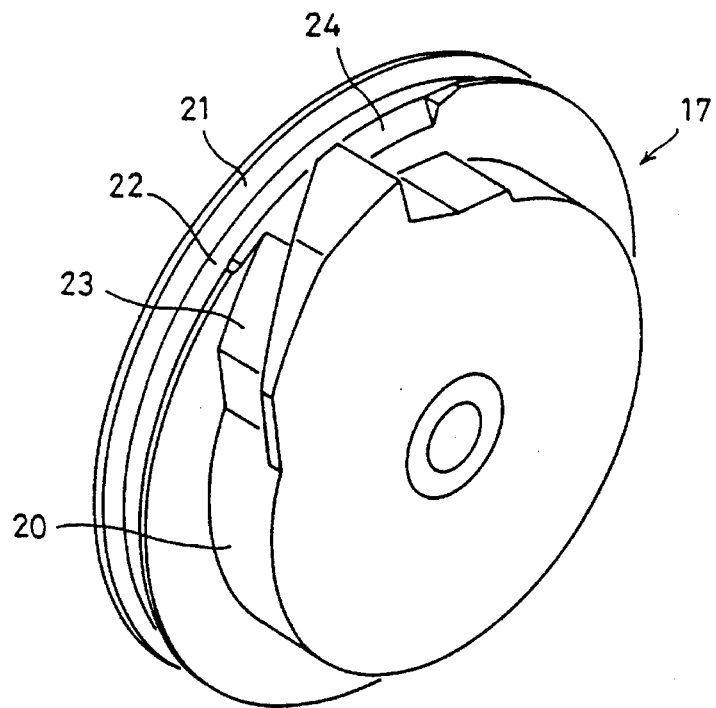
FIG. 9 is a perspective view of a cam plate.

As shown in FIGS. 7 through 9, the cam plate 17 has an inner circular surface 20 that is kept out of contact with the engaging roller 16. When the engaging roller 16 is located opposite to the circular surface 20, the roller shaft 10 is urged rearwards by the springs 15 so that the press roller 7 is pressed against the feed roller 8.

The cam plate 17 also has a roller separating cam surface 22 formed with a guide flange 21. The cam surface 22 has a larger diameter than the circular surface 20. When the engaging roller 16 is brought into contact with the roller separating cam surface 22, the roller 16 is pushed forward, so that the press roller 7 will separate from the feed roller 8.

The circular surface 20 is partially formed with a lateral feed cam surface 23 (FIG. 7) along which the engaging roller 16 is pushed up from the circular surface 20 toward the large-diameter roller separating cam surface 22. Adjacent the lateral feed cam surface 23 and on the side of the roller separating cam surface 22 is provided an oblique guide surface 24 along which the engaging roller 16 is adapted to be moved from the roller separating cam surface 22 toward the circular surface 20.

Figure 10:
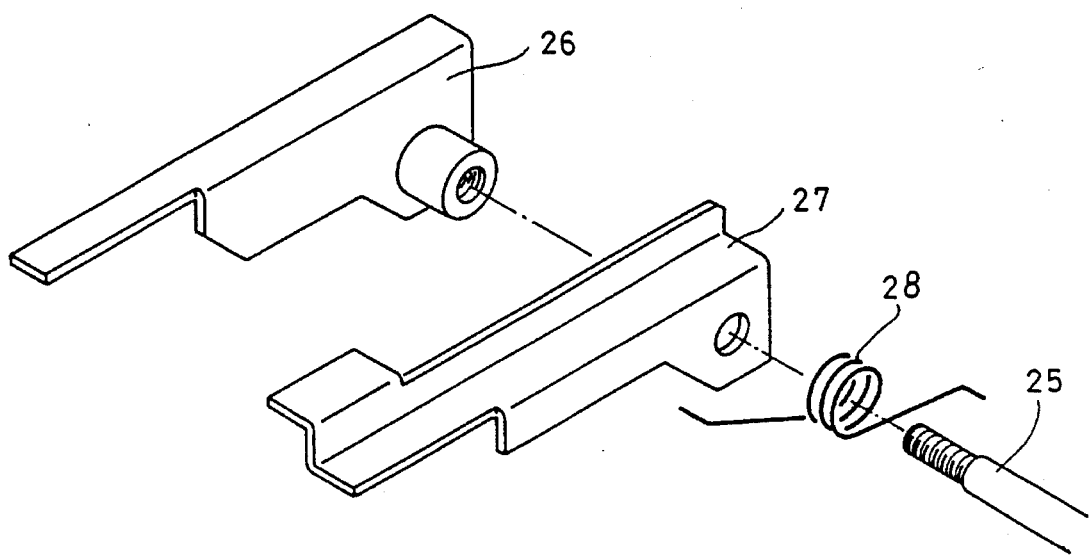
FIG. 10 is an exploded perspective view of roller restrictor plates.

On the other hand, over the rotary shaft 9 is provided a rotary actuator shaft 25 that extends parallel to the rotary shaft 9. Two roller restrictor plates 26, 27 are mounted on one end of the actuator shaft 25. As shown in FIGS. 7 and 10, one roller restrictor plate 26 is fixedly mounted to the actuator shaft 25, while the other roller restrictor plate 27 is pivotally mounted on it. The actuator shaft 25 also carries a spring 28 that urges the pivotable roller restrictor plate 27 against the fixed roller restrictor plate 26.

Figure 5:
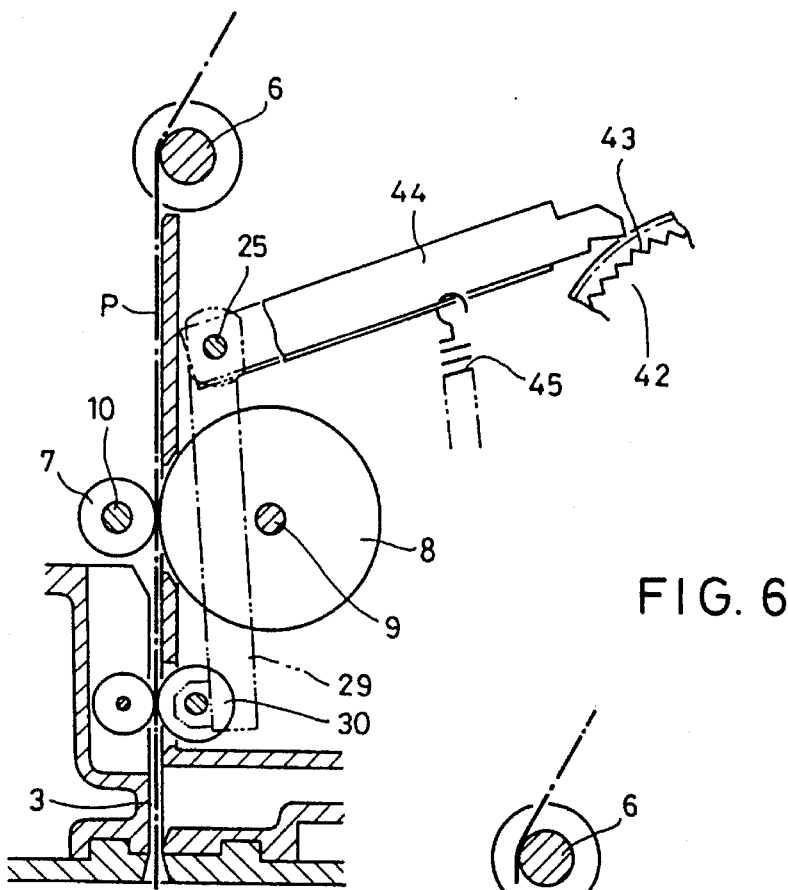
FIG. 5 is a vertical sectional front view of a portion shown in FIG. 4.
Figure 6:
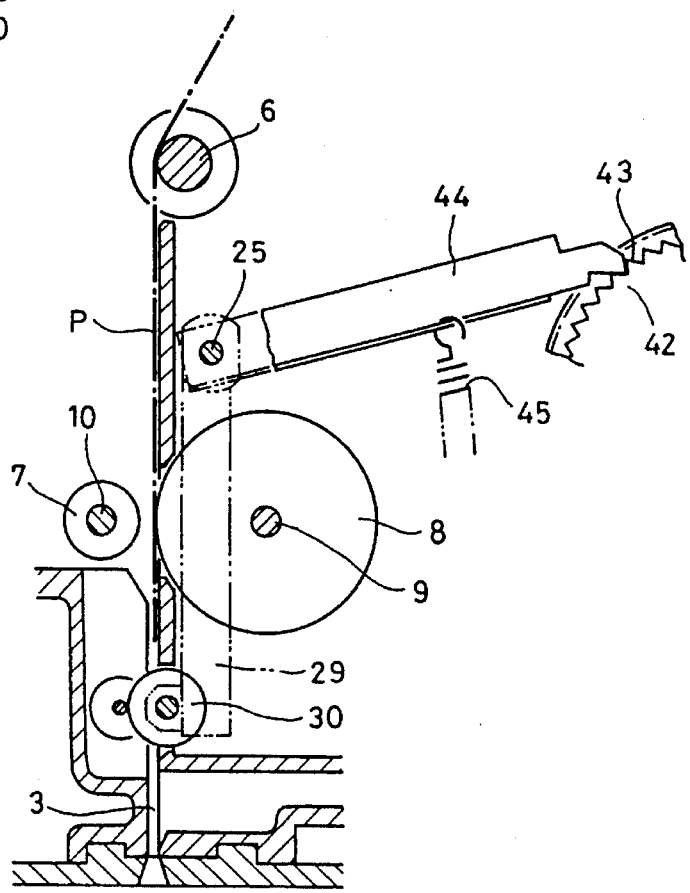
FIG. 6 is a vertical sectional front view showing an operational state of a portion of FIG. 5.

The actuator shaft 25 also carries on its central portion a detector arm 29 which in turn carries at its lower end a rotatable paper detection roller 30. As shown in FIGS. 5 and 6, the paper detection roller 30 is located in the feed path for photographic paper P that extends from the guide roller 6 to the paper outlet 3. While the photographic paper P is being fed along the feed path, the roller 30 is pushed backward by the photographic paper being fed. When there is no photographic paper P being fed, it will move forward.

Figure 11A:
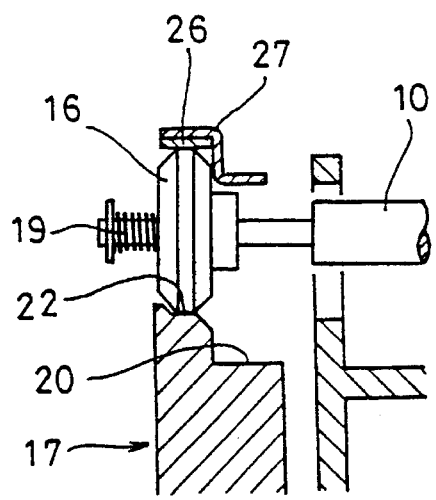
FIG. 11A is a vertical sectional side view explaining an operational state of the cam mechanism.
Figure 11B:
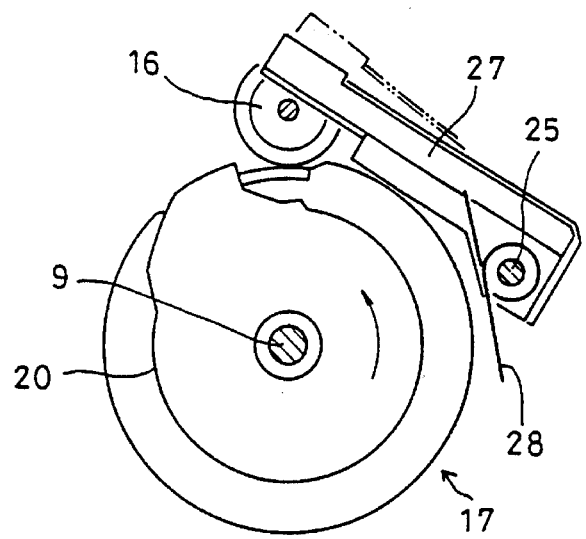
FIG. 11B is a front view of the same.
Figure 12A:
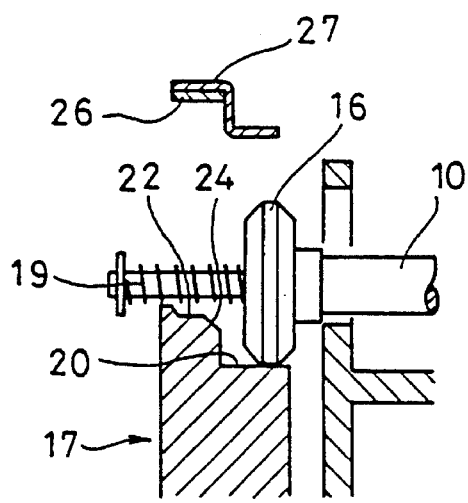
FIG. 12A is a vertical sectional side view explaining another operational state of the cam mechanism.
Figure 12B:
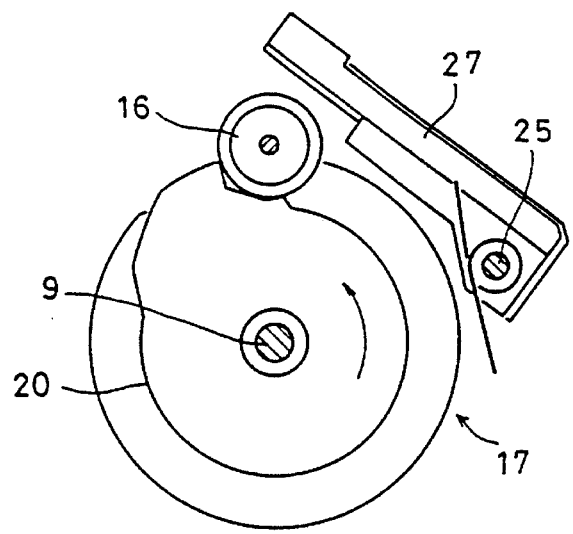
FIG. 12B is a front view of the same.

When the paper detection roller 30 is moved forward or backward, the roller restrictor plates 26, 27, which are coupled to the roller 30 through the detector arm 29 and the actuator shaft 25, will pivot upwards or downwards as shown in FIGS. 11A and 11B or 12A and 12B. When the roller restrictor plates 26, 27 pivot downwards, they are brought into contact with the inner end, of the engaging roller 16 as shown in FIG. 11B, thus preventing the engaging roller 16 from moving laterally toward the circular surface 20 on the cam plate 17. In contrast, when the roller restrictor plates 26, 27 pivot upwards as shown in FIG. 12A and 12B, they will move to a position where they do not interfere with the engaging roller 16. The engaging roller is thus pushed toward the circular surface 20 by the spring 19.

Figure 4:
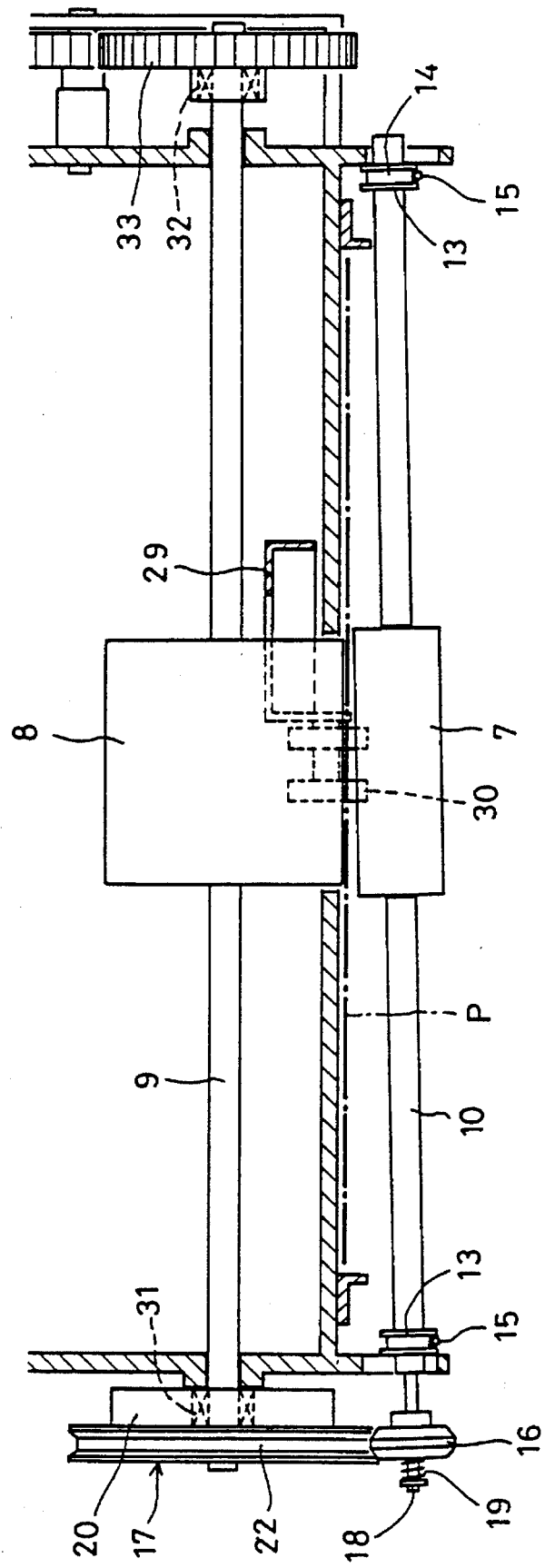
FIG. 4 is a cross sectional plan view showing the press rollers and the cam mechanism of the same.

The cam plate 17 is mounted on the rotary shaft 9 through a one-way clutch 31 as shown in FIG. 4 so as to be rotatable only in the direction of arrow A in FIG. 3. On the opposite end of the rotary shaft 9 a feed gear 33 is mounted through a one-way clutch 32 that permits the feed gear 33 to rotate only in the direction opposite to the direction of arrow A (i.e. the direction of arrow B in FIG. 3).

Figure 13:
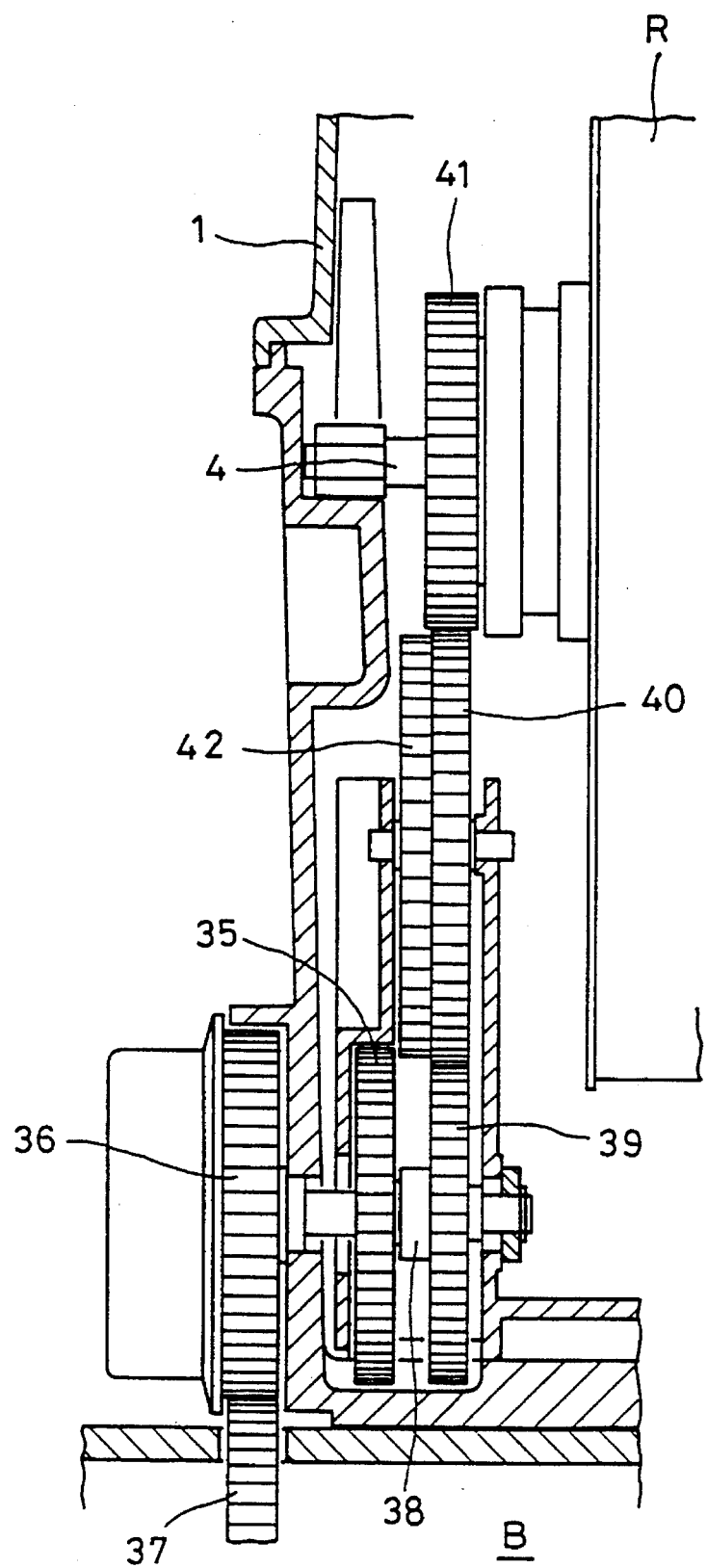
FIG. 13 is a sectional view of a power transmission mechanism of the same.

As shown in FIGS. 1, 3 and 13, the feed gear 33 is meshed with a gear 34 which is meshed with an intermediate gear 35 to which is coupled an input gear 36 which in turn meshes with a driving gear 37 that partially protrudes from the photographic printing apparatus B (FIG. 13). The input gear 36 and an advance roller 54, which will be described later, are driven by a single common motor.

The intermediate gear 35 is coupled to a shaft 38 to which is coupled a core driving gear 39 through a one-way clutch (not shown) which permits the gear 39 to rotate only in the direction of arrow C of FIG. 3. The core driving gear 39 meshes with a ratcheted gear 40 that in turn meshes with one of core gears 41 coupled to the core 5.

The ratcheted gear 40 comprises a gear body and a ratchet disc 42 secured to one side of the gear body and formed with many ratchet pawls 43 along its circumference (FIG. 1). A locking plate 44 is coupled at one end thereof to the actuator shaft 25 so as to be pivotable toward the circumference of the ratchet disc 42. To the locking plate 44 is coupled a spring 45 to urge its tip into engagement with the ratchet pawl 43 at all times.

Figure 14:
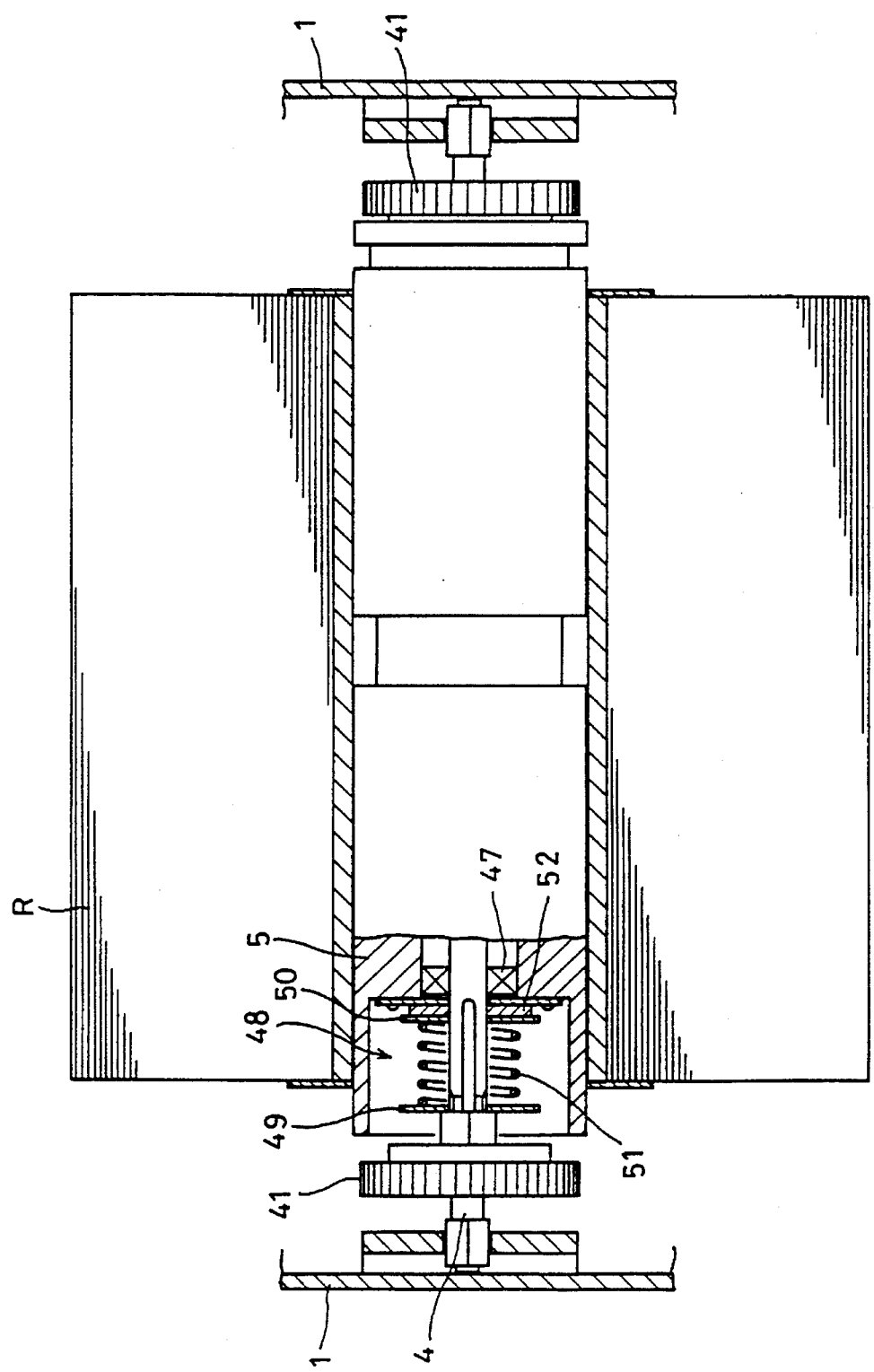
FIG. 14 is a front view partially in vertical section of the core and a friction generating mechanism of the same.

As shown in FIG. 14, the core gears 41 are provided inside the side walls of the paper magazine case 1 and supported on the support shaft 4, on which is rotatably mounted the core 5 of the roll R through bearings 47.

A friction generating mechanism 48 is mounted between the support shaft 4 and the core 5. It comprises oppositely arranged friction plates 49 and 50, another friction plate 52 sandwiched between the friction plate 50 and the end face of the core 5, and a coil spring 51 that urges the friction plate 52 against the core 5 to produce a frictional resistance therebetween. Due to this frictional resistance, the core 5 is adapted to rotate together with the core gears 41.

The paper magazine A of this embodiment is mounted on the top plate of the photographic printing apparatus B so that, as shown in FIG. 1, the paper outlet 3 of the paper magazine case 1 is located directly opposite to a paper inlet 53 of the photographic printing apparatus B.

In the photographic printing apparatus B and under the paper inlet 53 is provided a pair of advance rollers 54 for feeding photographic paper P. They are adapted to rotate faster than the feed roller 8 of the press roller pair in the paper magazine A. Near the advance rollers 54 is provided a sensor 55 for detecting the photographic paper.

We will now describe the operations of the paper magazine of this embodiment.

Feeding Photographic Paper (1) When feeding photographic paper

The engaging roller 16 is in contact with the roller separating cam surface 22 of the cam plate 17 as shown in FIG. 8. When the feed gear 33 is driven by the input gear 36, the cam plate 17 will pivot, moving the engaging roller 16 onto the circular surface 20 by way of the lateral feed cam surface 23. This causes the press roller 7 and the feed roller 8 to be pressed against photographic paper P. It is thus fed. Photographic paper P is fed by the feed roller 8 by the length corresponding to the angle by which the cam plate 17 rotates until the engaging roller 16 is again brought, into contact with the lateral feed cam surface 23. Then, the engaging roller 16 is moved laterally onto the cam surface 22 by way of the lateral feed cam surface 23.

While the leading end of the photographic paper P is passing by the paper detection roller 30 as shown in FIG. 5, the paper detection roller 30 will be pushed back. At the same time, the roller restrictor plates 26, 27 will pivot downwards until they abut the inner end face of the engaging roller 16 as shown in FIGS. 11A and 11B. The engaging roller 16 is thus prevented from moving toward the circular surface 20, so that the press rollers 7 and 8 are kept separate from each other.

On the other hand, while the leading end of the photographic paper P is not passing by the paper detection roller 30, the roller restrictor plates 26, 27 are kept raised as shown in FIG. 12A and 12B. Thus, the engaging roller 16, which has been moved onto the cam surface 22 by way of the lateral feed cam surface 23, will be pushed by the spring 19 and moved again onto the circular surface 20 by way of the guide surface 24, pressing the press rollers 7 and 8 against the photographic paper P again. It is thus fed again by the feed roller 8. This cycle is repeated until the leading end of the photographic paper P is detected by the paper detection roller 30.

While feeding photographic paper P, the core 5 of the roll R is rotated by the tensile force applied to the photographic paper P. But since the input gear 36 is rotating faster than the ratcheted gear 40, the one-way clutch for the gear 39 will disengage, so that no force is transmitted between the intermediate gear 35 and the core gears 41. In other words, the core 5 rotates with no load applied thereto.

In the above paper feeding operation, if the photographic P is caught between the advance rollers 54 of the photographic printing apparatus B before being freed from the restraint of the press rollers 7 and 8, the one-way clutches 32 mounted between the feed gear 33 and the rotary shaft 9 will disengage because the peripheral speed of the advance rollers 54 is set greater than that of the feed roller 8. Thus, the feed roller 8 will rotate with no load.

If the leading end of the photographic paper P has passed by the sensor 55 of the photographic printing apparatus B, the advance rollers 54 will keep rotating until the leading end of the photographic paper P reaches the exposure unit 86. If the sensor 55 has not detected photographic paper P, the advance rollers 54 are rotated in a reverse direction for a predetermined period to rewind the photographic paper P until its leading end gets back to a predetermined point in the paper magazine case 1. Then, the above operation is repeated, i.e. photographic paper is fed forward again.

(2) Rewinding Photographic Paper (2-1) Photographic Paper is not Pressed by the Press Rollers 7, 8

This state is a normal state when rewinding. The core 5 is rotated under the driving force transmitted through the input gear 36 in such a direction that the photographic paper is rewound. Since the outer diameter of the roll R of the photographic paper P is greater than that of the advance rollers 54, the peripheral speed of the core 5 is higher than that of the advance rollers. Thus, there appears a difference in rotational speed between the core 5 and the core gears 41. This actuates the friction generating mechanism 48 in the core 5. Namely, slip occurs in the friction generating mechanism 48 due to the driving force transmitted to the core 5. The photographic paper P will be thus rewound at a speed equal to the peripheral speed of the advance rollers 54.

In this rewinding operation, while the leading end of the photographic paper P is out of the paper magazine case 1, the paper detection roller 30 is kept pushed back, so that the locking plate 44 is kept separate from the ratchet disc 42.

When the photographic paper is rewound until its leading end passes the paper detection roller 30, the latter will move forward. The locking plate 44, operatively associated therewith, thus pivots down until its tip engages the ratchet pawl 43. The rewinding thus stops. But the driving motor in the photographic printing apparatus B keeps rotating. There may be provided a friction generating mechanism similar to the one provided in the core 5, between the driving motor and the input gear 36. This mechanism serves to prevent the transmission of driving force to the core 5 by slipping.

The driving motor is adapted to rotate a little more after the photographic paper P has passed the sensor 55 and the locking plate 44 has engaged the ratchet pawl 43.

The dimensions of the parts and the numbers of teeth of the respective gears are determined so that the leading end of the photographic paper P will stop between the paper detection roller 30 and the feed roller 8. With this arrangement, it is possible to transmit the driving force of the press roller 7 and the feed roller 8 to the photographic paper P when feeding it the next time.

(2-2) Press Rollers 7 and 8 are Pressed Against Each Other

This state is an abnormal state which may be caused by operational error. The feed roller 8 will rotate at the speed set for rewinding the photographic paper P under the driving force transmitted through the input gear 36.

In this state, since the feed roller 8, mounted on the rotary shaft 9, is rotating faster than the feed gear 33, also mounted on the rotary shaft 9, one-way clutch 32 in the feed gear 33 will lock. The photographic paper P will be rewound onto the core 5 at the same speed as the speed of the roller 8, with the core 5 slipping due to the action of the friction generating mechanism 48. While the respective members are rotating in this direction, the one-way clutch 31 mounted between the cam plate 17 and the rotary shaft 9 is disengaged, so that no force is applied to the cam plate 17. Thus, the cam plate 17 will never restrict the rotation of the feed roller 8.

(3) Printing Photographic Paper

In this state, the driving motor for driving the input gear 36 is deactivated and the core gears 41 are not rotating.

The photographic paper is urged by the feed force produced in the photographic printing apparatus B in a direction so as to be pulled out of the paper magazine case 1. Thus, slip occurs in the friction generating mechanism 48 in the core 5. Photographic paper P is thus pulled into the photographic printing apparatus B with back-tension being applied thereto.

Since the photographic paper is fed in a tensioned state, this prevents the slackening of the photographic paper P and thus eliminates variations in the feed length of the photographic paper to the exposure unit 86.

FIGS. 15 to 19 show a second embodiment.

Figure 15:
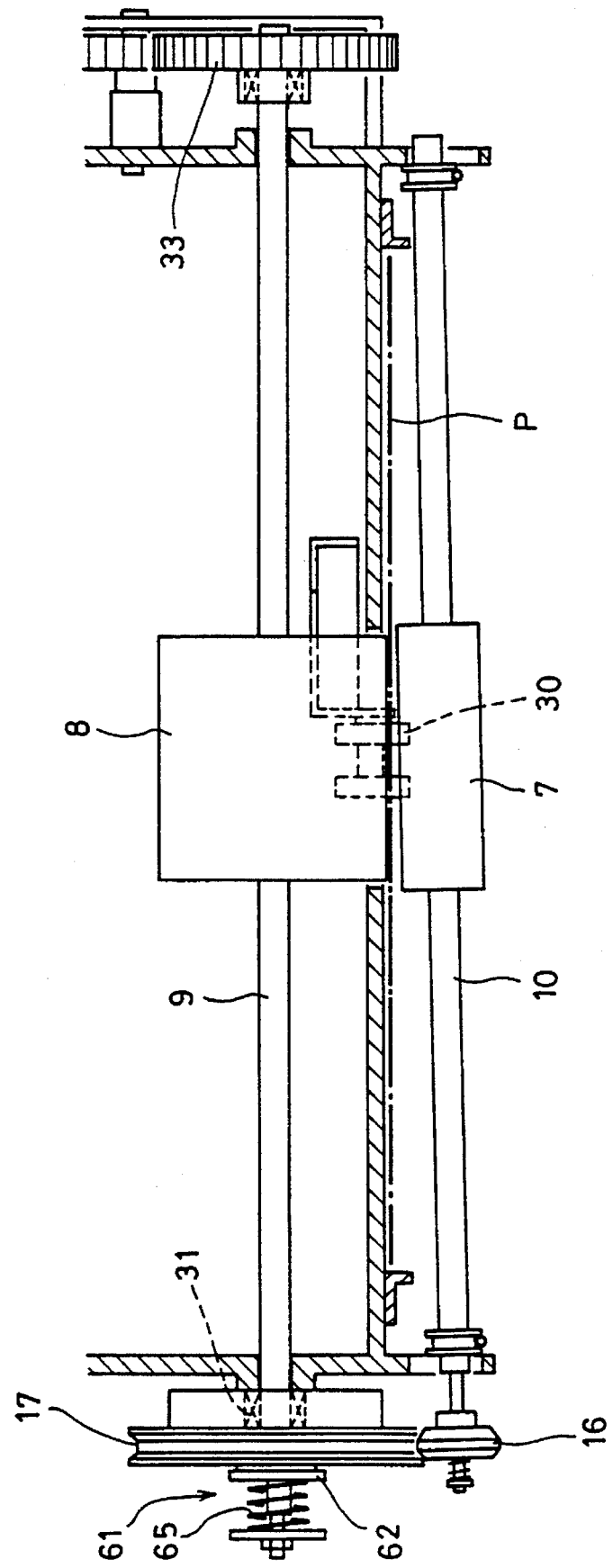
FIG. 15 is a vertical sectional side view of a second embodiment.

In this embodiment, as shown in FIG. 15, at the end of the rotary shaft 9 where the cam plate 17 is coupled thereto, a torque limiter 61, which serves to transmit torque by making use of frictional force, is mounted.

Figure 16A:
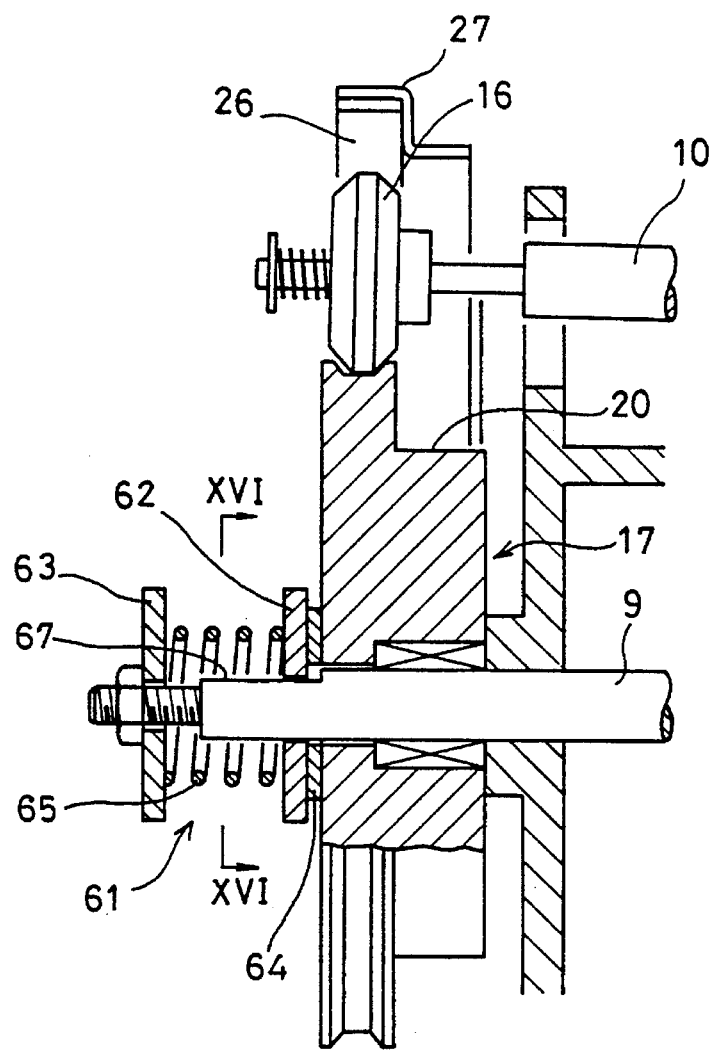
FIG. 16A is a sectional view showing a torque limiter of the same.
Figure 16B:
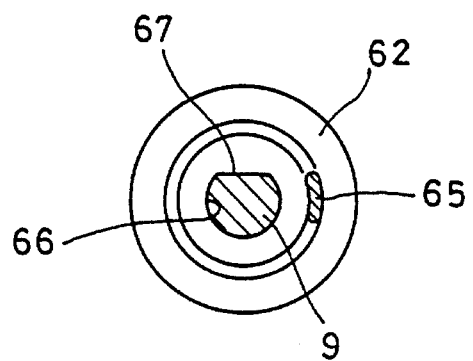
FIG. 16B is a sectional view taken along line XVI—XVI of FIG. 16A.

The torque limiter 61 comprises, as shown in FIG. 16A and 16B, a presser plate 62 and a spring seat 63 mounted on the end of the rotary shaft 9, a friction plate 64 provided between the presser plate 62 and the cam plate 17, and a friction spring 65 mounted between the presser plate 62 and the spring seat 63 to bias the presser plate 62 axially and to thus to press the friction plate 64 against the end face of the cam plate 17. The presser plate 62 and the rotary shaft 9 are prevented from rotating relative to each other by complementary flat surfaces 67 (FIG. 16B) formed on the surface of the rotary shaft 9 and on the surface of a hole 66 of the presser plate 62 through which the rotary shaft 9 extends, though they can move axially relative to each other.

When the rotary shaft 9 rotates, its torque is transmitted through the presser plate 62 to the friction plate 64. Thus, the cam plate 17 is rotated by the frictional force produced at the press-contact portion. On the other hand, if the rotation of the cam plate 17 is forcibly stopped, only the rotary shaft 9 will rotate, while the friction plate 64 and the cam plate 17 is kept in sliding contact with each other.

Figure 17A:
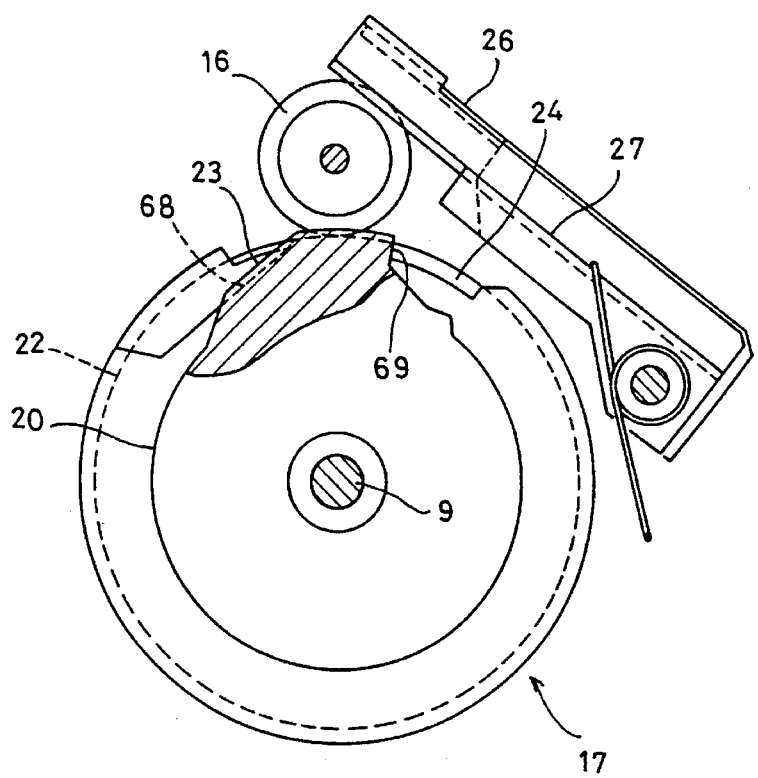
FIG. 17A is a sectional view of the cam plate of the same.
Figure 17B:
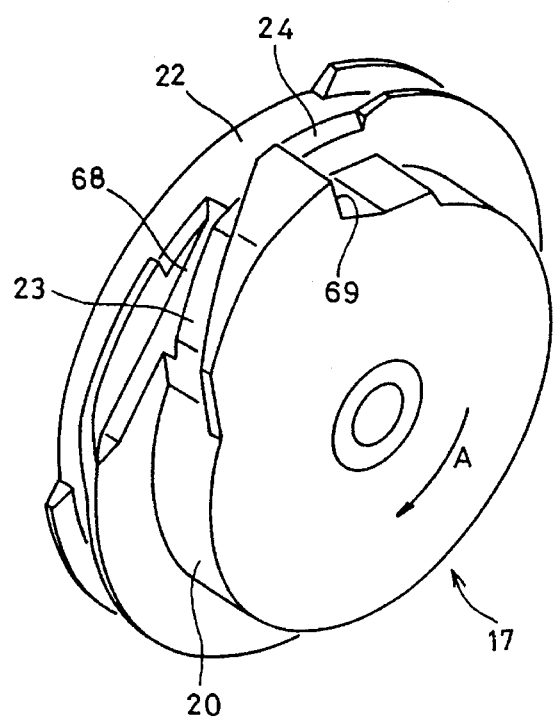
FIG. 17B is a perspective view of the cam plate.

As shown in FIG. 17A and 17B, on the outer circumferential surface of the cam plate 17 and adjacent the lateral feed cam surface 23 is formed a downwardly inclined guide surface 68 through which the roller separating cam surface 22 is connected to the circular surface 20. At one end of the circular surface 20, a radially raised stop surface 69 is formed. The cam plate 17 is adapted to be stopped when the engaging roller 16 abuts the surface 60.

Figure 18A:
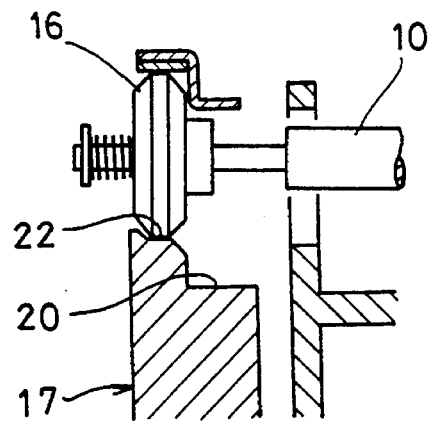
FIG. 18A is a vertical sectional front view showing an operational state of the same.
Figure 18B:
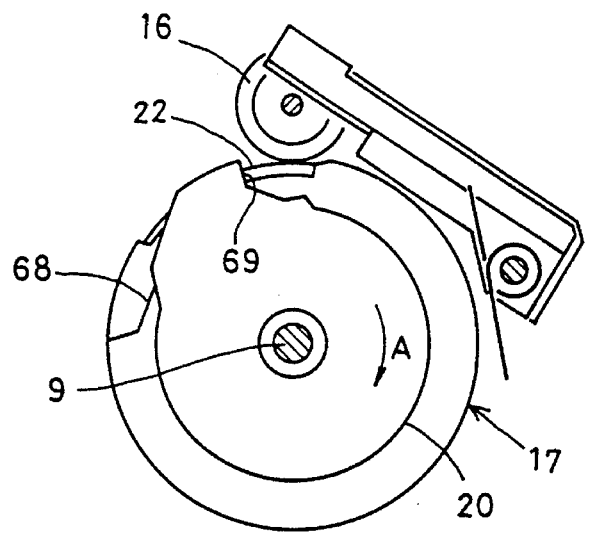
FIG. 18B is a front view of the same.
Figure 19A:
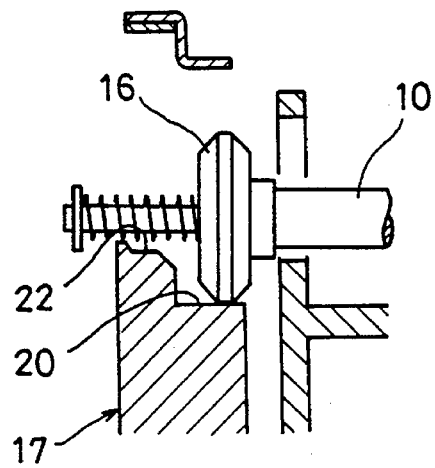
FIG. 19A is a vertical sectional front view showing another operational state of the same.
Figure 19B:
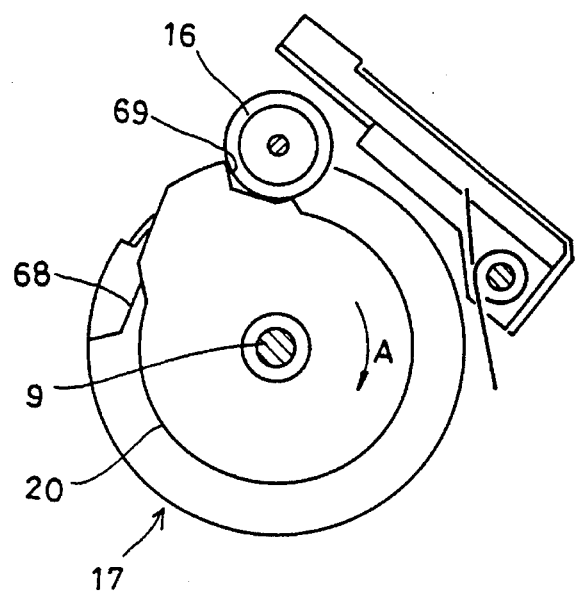
FIG. 19B is a front view of the same.
Figure 20:
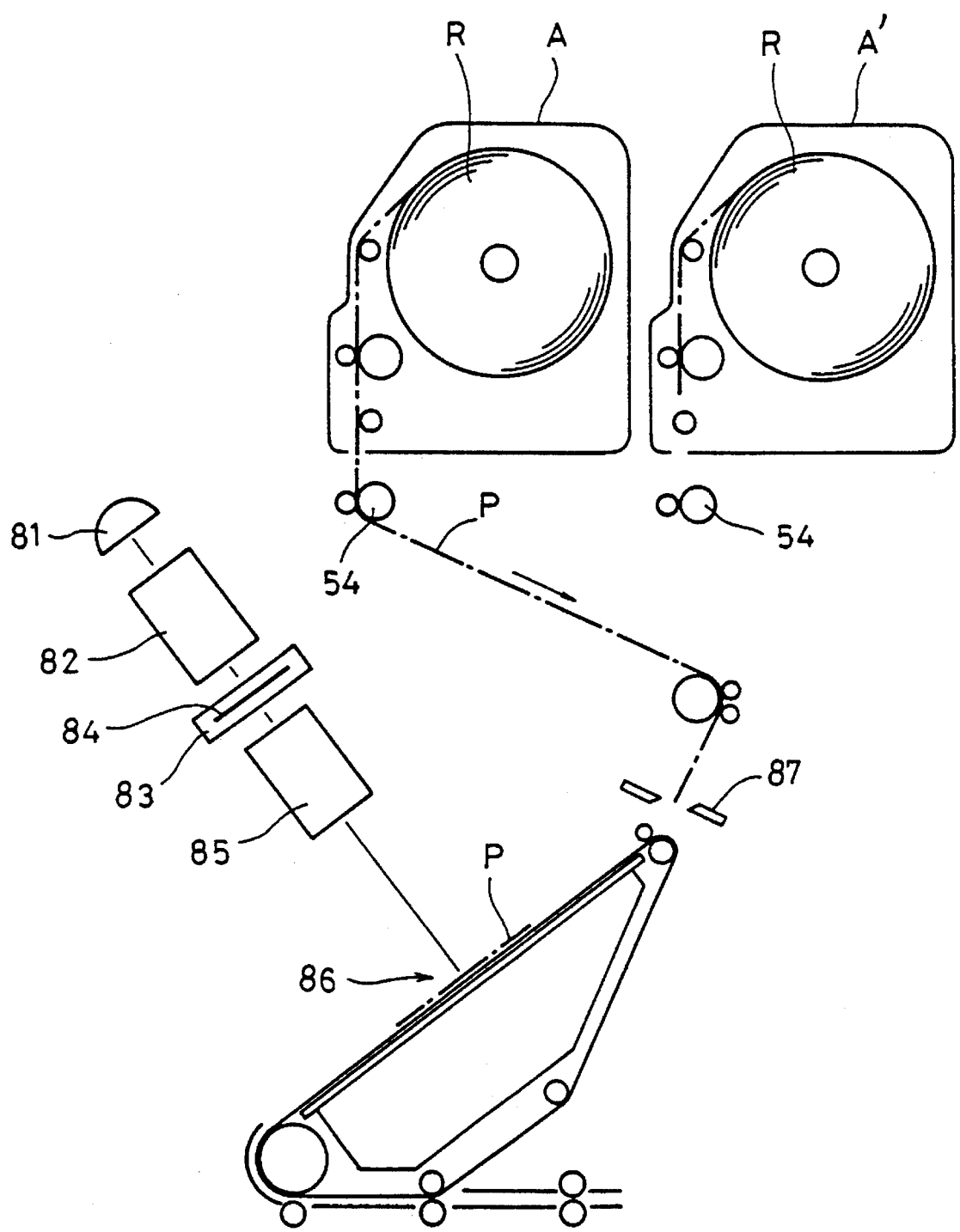
FIG. 20 is a schematic view showing the structure of a photographic printing apparatus.

In this embodiment, when the rotary shaft 9 and the cam plate 17 are rotated from the state shown in FIG. 18A and 18B, in which the press rollers 7, 8 are separate from each other, in the paper rewinding the direction (direction of arrow A in the figure), the cam engaging roller 16, now on the roller separating cam surface 22 (FIG. 17A), will move onto the downwardly inclined guide surface 68 and then onto the circular surface 20 (this state is shown in FIGS. 19A and 19B). The press roller 7 is thus pressed against the feed roller 8.

When the feed roller 8 begins to rotate in the rewinding direction, the paper is fed toward the core 5 of the paper roll. Namely, .the paper is rewound into the magazine and taken up onto the core 5. With this arrangement, even if the rear end of the paper roll is not fastened to the core 5 or even if the remaining portion of the paper runs short and the paper rear end should come off the core 5, it is possible to rewind the paper onto the core in the magazine, so long as part of the paper remains in the paper feed path in the magazine. Then, simply by rotating the press roller and the core 5 in reverse, the paper can be fed out of the magazine. No paper will remain in the magazine and thus there will be no loss of paper.

On the other hand, when the engaging roller 16, reiterated in contact with the circular surface 20, abuts the stop surface 69, the cam plate 17 will stop rotating. The driving force, which has been transmitted to the cam plate 17 is cut off by the torque limiter 61. In this state, only the rotary shaft 9 can rotate. When the paper is rewound onto the rotating core 5 so its leading end passes the paper detection roller 30, the locking plate 44 will engage the ratcheted gear 40, stopping the rotation of the core 5 and thus the rewinding of the paper.

While the rewinding of paper is stopped, the engaging roller 16 is located on the circular surface 20 of the cam plate 17 so that the press rollers are pressed against the paper. Thus, the paper is held in place even if the paper magazine is vibrated e.g. when carrying it. This makes it possible to feed paper reliably when loading it the next time.

What is claimed is:

1. A paper magazine, comprising:

a paper magazine case rotatably supporting a paper roll core therein, said paper magazine case having a paper outlet and a paper feed path extending from said paper roll core to said paper outlet;

a pair of press rollers provided in said paper magazine case along said paper feed path, one of said press rollers being movably mounted so as to be pressable against and separable from the other of said press rollers with said paper feed path therebetween;

a paper detection roller movably mounted between said press rollers and said paper outlet along said paper feed path for contact with paper fed along said paper feed path so as to detect the presence or absence of paper in said paper feed path according to the position of said paper detection roller;

a cam means associated with said paper detection roller for pressing said press rollers against each other and separating said press rollers from each other according to the position of said paper detection roller;

power transmission means coupled to said paper roll core and said press rollers for transmitting directional external driving force to said paper roll core and said press rollers; and changeover means provided in said power transmission means for selectively transmitting the directional external driving force to said paper roll core and said press rollers according to the direction of the directional external driving force such that said press rollers are pressed against each other with paper therebetween when said paper roll core is rotated in a direction to feed the paper forward therefrom and said press rollers are separated from each other when said paper roll core is not rotated in a direction to feed the paper forward therefrom.

2. The paper magazine of claim 1, wherein said cam means is responsive to movement of said detection roller upon said detection roller detecting the absence of paper in said paper feed path during rewinding of paper onto said paper roll core to press said press rollers against each other with the paper therebetween.

3. The paper magazine of claim 2, and further comprising a friction generating means located between said paper roll core and said power transmission means for imparting a frictional force to said paper roll core when said paper roll core is rotating relative to said power transmission means.

4. The paper magazine of claim 2, and further comprising a locking plate connected with said paper detection roller for engaging said power transmission means and cutting off the transmission of power to said core when said paper detection roller changes position in response to the detection of the absence of paper.

5. The paper magazine of claim 2, and further comprising a torque limiting means for disassociating said paper detection roller and said cam means when said torque limiting means is subjected to a torque higher than a predetermined torque.

6. The paper magazine of claim 1, wherein said cam means further comprises means for pressing said press rollers against each Other with the paper therebetween when said paper roll core is rotated in a rewinding direction and means for maintaining said press rollers pressed against each other irrespective of the position of said paper detection roller.

7. The paper magazine of claim 6, and further comprising a torque limiting means for disassociating said paper detection roller and said cam means when said torque limiting means is subjected to a torque higher than a predetermined torque.

8. The paper magazine of claim 7, and further comprising a locking plate connected with said paper detection roller for engaging said power transmission means and cutting off the transmission of power to said core when said paper detection roller changes position in response to the detection of the absence of paper.

9. The paper magazine of claim 7, and further comprising a friction generating means located between said paper roll core and said power transmission means for imparting a frictional force to said paper roll core when said paper roll core is rotating relative to said power transmission means.

10. The paper magazine of claim 6, and further comprising a locking plate connected with said paper detection roller for engaging said power transmission means and cutting off the transmission of power to said core when said paper detection roller changes position in response to the detection of the absence of paper.

11. The paper magazine of claim 6, and further comprising a friction generating means located between said paper roll core and said power transmission means for imparting a frictional force to said paper roll core when said paper roll core is rotating relative to said power transmission means.

12. The paper magazine of claim 1 and further comprising a locking plate connected with said paper detection roller for engaging said power transmission means and cutting off the transmission of power to said core when said paper detection roller changes position in response to the detection of the absence of paper.

13. The paper magazine of claim 12, and further comprising a friction generating means located between said paper roll core and said power transmission means for imparting a frictional force to said paper roll core when said paper roll core is rotating relative to said power transmission means.

14. The paper magazine of claim 1, and further comprising a friction generating means located between said paper roll core and said power transmission means for imparting a frictional force to said paper roll core when said paper roll core is rotating relative to said power transmission means.

15. The paper magazine of claim 1, and further comprising a torque limiting means for disassociating said paper detection roller and said cam means when said torque limiting means is subjected to a torque higher than a predetermined torque.

16. A paper magazine, comprising:

a paper magazine case rotatably supporting a paper roll core therein, said paper magazine case having a paper outlet and a paper feed path defined therein extending from said paper roll core to said paper outlet;

a pair of press rollers mounted on respective rotatable shafts in said paper magazine case along said paper feed path and with said paper feed path therebetween, wherein one of said press rollers is biased toward the other of said press rollers and has a cam follower on said respective rotatable shaft thereof;

a paper detection roller movably mounted along said paper feed path between said pair of press rollers and said paper outlet, said paper detection roller comprising a roller that is mounted on a pivoted arm and biased into said paper feed path;

a cam mechanism comprising a cam plate rotatably coupled with said respective rotatable shaft of the other of said press rollers, said cam plate having an inner cam surface, a roller separating cam surface and transition surfaces between said inner cam surface and said roller separating cam surface, and restrictor plates pivotably connected with said paper detection roller for pivoting movement in response to movement of said paper detection roller, wherein said cam follower engages one of said cam surfaces and is movable to the other of said cam surfaces, said restrictor plate being engageable with said cam follower when said cam follower engages said roller separating cam surface, and wherein said pair of press rollers engage each other when said cam follower is on said inner cam surface and do not engage each other when said cam follower is on said roller separating cam surface;

a power transmission coupled to said paper roll core and said press rollers and having a directional external driving force input, said power transmission comprising changeover means for selectively transmitting the directional external driving force to said paper roll core and said press rollers according to the direction of the directional external driving force such that said press rollers are pressed against each other with paper therebetween when said paper roll core is rotated in a direction to feed the paper forward therefrom and said press rollers are separated from each other when said paper roll core is not rotated in a direction to feed the paper forward therefrom.

17. The paper magazine of claim 16, wherein said cam mechanism is responsive to movement of said detection roller upon said detection roller detecting the absence of paper in said paper feed path during rewinding of paper onto said paper roll core to press said press rollers against each other with the paper therebetween.

18. The paper magazine of claim 16, wherein said cam mechanism further comprises means for pressing said press rollers against each other with the paper therebetween when said paper roll core is rotated in a rewinding direction and means for maintaining said press rollers pressed against each other irrespective of the position of said paper detection roller.

19. The paper magazine of claim 16, and further comprising a torque limiter between said cam plate and said respective rotatable shaft of the other of said press rollers rotatably disconnecting said cam plate and said respective rotatable shaft when said torque limiter is subjected to a torque higher than a predetermined torque.

20. The paper magazine of claim 16, and further comprising a locking plate connected with said paper detection roller for engaging said power transmission means and cutting off the transmission of power to said core when said paper detection roller changes position in response to the detection of the absence of paper.

21. The paper magazine of claim 16, and further comprising a friction generating means located between said paper roll core and said power transmission means for imparting a frictional force to said paper roll core when said paper roll core is rotating relative to said power transmission means.

* * * * *